July 1, 1930.     B. E. RODIN     1,769,548
AUTO CREEPER
Filed Feb. 13, 1929     2 Sheets-Sheet 1
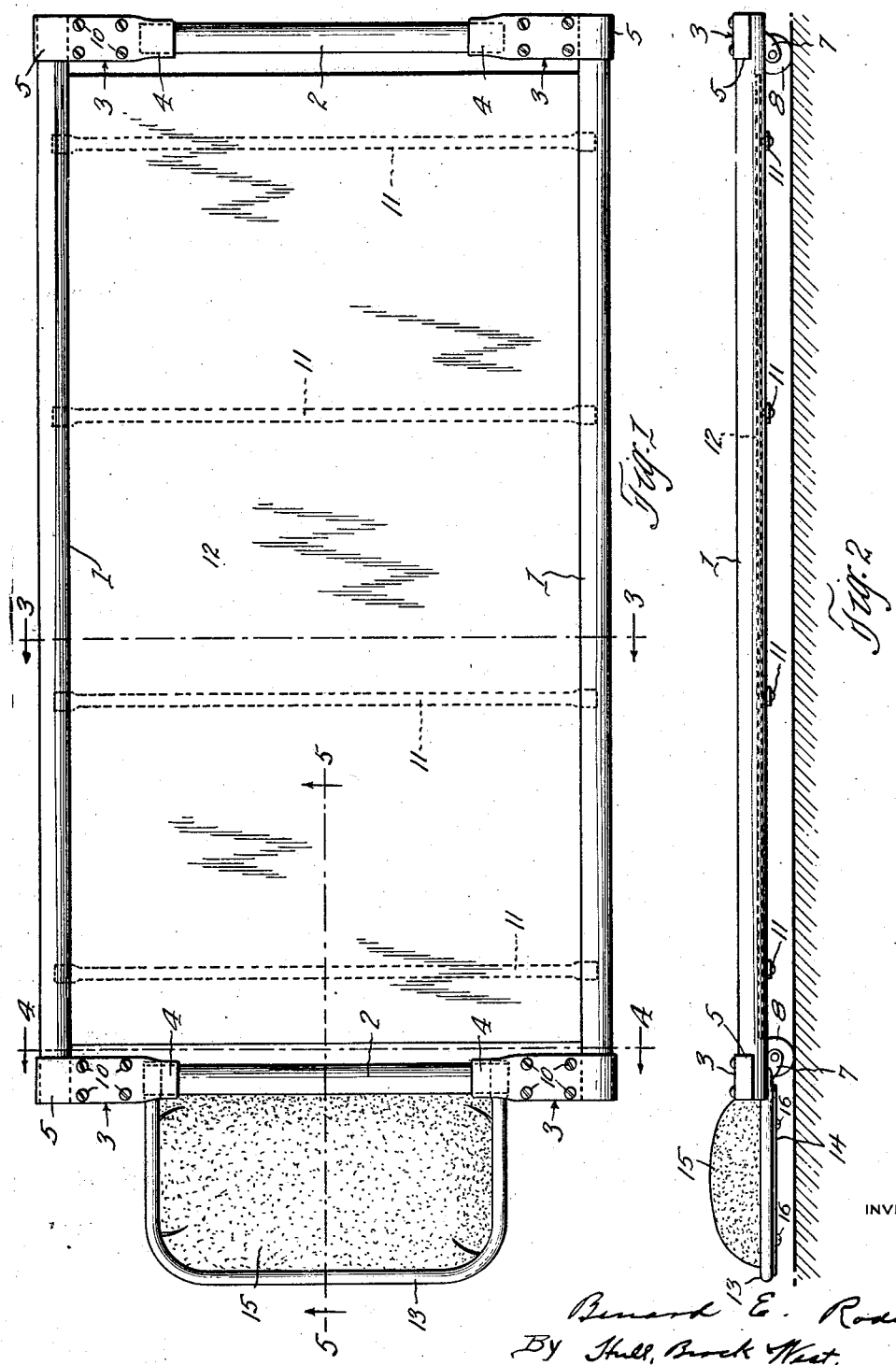
INVENTOR
Bernard E. Rodin,
By Hull, Brock West,
ATTORNEYS July 1, 1930.                B. E. RODIN                1,769,548
                             AUTO CREEPER
                        Filed Feb. 13, 1929            2 Sheets-Sheet 2

INVENTOR
Bernard E. Rodin,
BY
ATTORNEYS

Patented July 1, 1930

1,769,548

UNITED STATES PATENT OFFICE

BENARD E. RODIN, OF EAST CLEVELAND, OHIO

AUTO CREEPER

Application filed February 13, 1929. Serial No. 339,520.

This invention relates to devices known to the trade as auto creepers and which are employed for the purpose of providing a support by means of and upon which the users are enabled to move themselves to various positions beneath an automobile for the purpose of inspecting the parts, repairing, adjusting, and otherwise operating upon the same.

Owing to the demand for low-hung bodies, the running boards with which automobiles are equipped have been brought so close to the ground as to make it impossible for workmen to use auto creepers as constructed heretofore; in fact, these devices have gone out of use for the reason stated.

It is the general purpose and object of my invention to construct an auto creeper which will enable a workman, while resting thereon, to pass beneath the running boards and under the other parts of automobiles as now constructed. A further object of the invention is to provide an auto creeper with an improved construction and arrangement of head rest; also to provide an improved construction of supporting frame and tray or bed.

Figure 3:
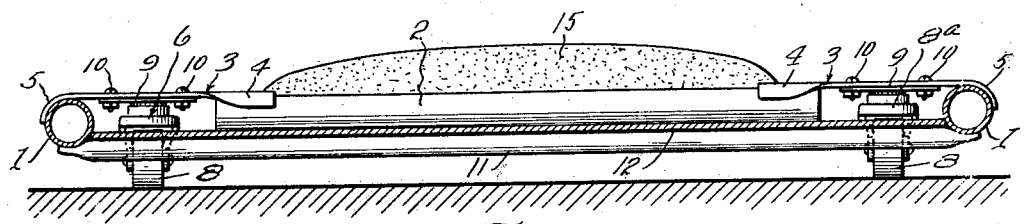
Figure 4:
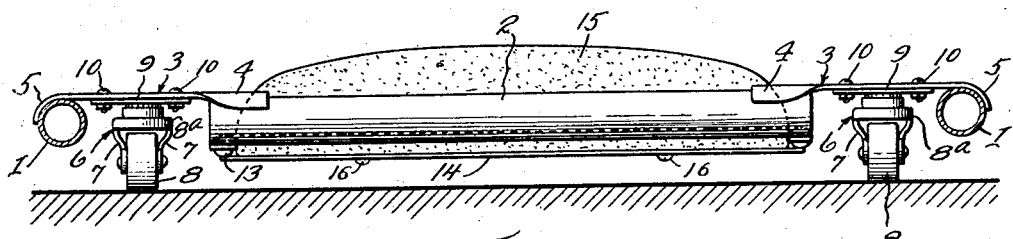
Figure 5:
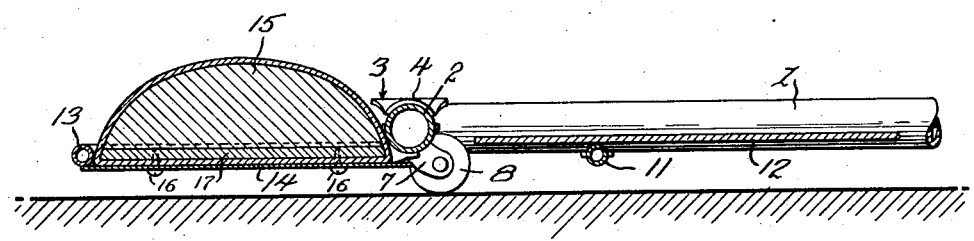

I accomplish the foregoing objects in and through the construction and arrangement of parts shown in the drawings, wherein Fig. 1 represents a plan view of my device; Fig. 2 a side elevation of the same; and Figs. 3, 4 and 5 are details in section corresponding respectively to the lines 3—3, 4—4 and 5—5 of Fig. 1.

Describing the parts by reference characters, 1, 1 denote the side members and 2, 2 the end members of a rectangular frame, the said members being formed preferably of tubing and the side members being shown as extending the full length of the frame. Each end member 2 is shown as somewhat shorter than the width of the frame, the ends of the said end members being connected by brackets 3 with the side members, as by welding. Each bracket consists preferably of a flat sheet metal body having one end transversely rounded, as shown at 4, whereby it is fitted on top of the adjacent end of the member 2, and having its opposite end longitudinally rounded, as shown at 5, to conform to the outer and upper surface of the end of the adjacent side member.

By the manner of connecting the side and end members, an upwardly-extending recess is provided adjacent each corner of the frame, the bottom of each recess being defined by a bracket 3 which is in practically the plane of the tops of the side and end members.

6 denotes generally a caster provided with the usual forks 7 supporting a roller 8, the tops of the forks being connected to a casing 8ª forming the outer race for a ball bearing, the balls in said bearing engaging the base 9 which is fastened to the bracket 3, as by bolts 10.

By mounting the casters in the manner descirbed, the supporting bases 9 for the same are (as will appear hereinafter) above the tray or bed. This construction enables me to provide a low, or under-slung, construction of frame, bringing the frame and the tray or bed thereon in close proximity to the surface over which the creeper moves. In practice, I am enabled to use rather large-sized rollers in the casters, thereby reducing friction, and at the same time to provide a clearance of only one inch between the top of the tray and the surface over which the rollers move.

Extending transversely of the frame and connected to the bottoms of the side members 1 are transverse tubular supports 11. These supports are preferably welded to the side members and carry the tray or bed 12, which may be made of fiber board or other convenient material and which is conveniently retained in place by being sprung beneath the overhanging inner central portions of the side members.

With this arrangement, the tray or bed is supported in close proximity to the floor or other supporting surface for the creeper, enabling the user of the same to move himself beneath the running boards and other parts of the vehicle.

The head rest which I employ also cooperates with the other parts to secure this clearance between the user of the device and the parts of the vehicle beneath which he is to move. The rest comprises a tubular U-shaped frame work 13 having its ends welded or otherwise suitably secured beneath one of the end members 2. This tubular frame has welded or otherwise secured to the bottom thereof a sheet metal base 14 on which is mounted a pad 15 for the head of the user. The pad is applied to the base by slipping it into the depression formed by the frame and securing it in place by screws 16 extending through the base 14 and into the base 17 of the pad, the latter base being of any suitable material, such as fiber board. The frame and head rest can be painted and, when dry, the pad inserted in place in the manner described. By constructing the head rest frame in the manner described and attaching it beneath the appropriate end member 2, a pad of proper thickness to afford comfort to the user will be provided, and at the same time there will be ample clearance between the head of the user and parts of the vehicle beneath which the creeper moves.

Having thus described my invention, what I claim is:

1. In a creeper, a pair of spaced bars and a pair of cross members connecting said bars, said cross members each including a bar of a length less than the distance between said first bars and means attached to the top of said last bar and projecting beyond the ends thereof and each attached to the top of one of said first bars, the ends of said last bar being spaced from the said first bars, and casters attached to the under sides of said means.

2. In a creeper, a pair of spaced bars and a pair of cross members connecting said bars, said cross members each including a bar of a length less than the distance between said first bars and means attached to the top of said last bar and projecting beyond the ends thereof and each attached to the top of one of said first bars, the ends of said last bar being spaced from the said first bars, all said bars being tubular and said means comprising relatively thin strips, and casters attached to the under sides of said means.

3. In a creeper, a pair of spaced bars and a pair of cross members connecting said bars, said cross members each including a bar of a length less than the distance between said first bars and means attached to the top of said last bar and projecting beyond the ends thereof and each attached to the top of one of said first bars, the ends of said last bar being spaced from the said first bars, and a U-shaped frame member having the ends thereof attached to one of said cross members and a head rest carried by said U-shaped member.

4. In a creeper, a pair of spaced bars and a pair of cross members connecting said bars, said cross members each including a bar of a length less than the distance between said first bars and means attached to the top of said last bar and projecting beyond the ends thereof and each attached to the top of one of said first bars, the ends of said last bar being spaced from the said first bars, and casters attached to the under side of said means, there being a back rest carried between said pair of spaced bars and the upper surface thereof being made of a material which is a poor conductor of heat.

5. In a creeper, a pair of spaced bars and a pair of cross members connecting said bars, said cross members each including a bar of a length less than the distance between said first bars and means attached to the top of said last bar and projecting beyond the ends thereof and each attached to the top of one of said first bars, the ends of said last bar being spaced from the said first bars, casters attached to the under side of said means, and a U-shaped frame member having the ends thereof attached to one of said cross-members and a head rest carried by said U-shaped member, said head rest being removably attached to said U-shaped member and the upper surface thereof being made of a material which is a poor conductor of heat.

In testimony whereof, I hereunto affix my signature.

BENARD E. RODIN.